Inventor:
James A. Ottinger,
by Laurence R. Kempton
Attorney

Jan. 23, 1968 J. A. OTTINGER 3,365,071
RACK FOR SUPPORTING FOOD CONTAINERS AT SPACED
LEVELS WITHIN A COOKING VESSEL
Filed May 19, 1966 2 Sheets-Sheet 2
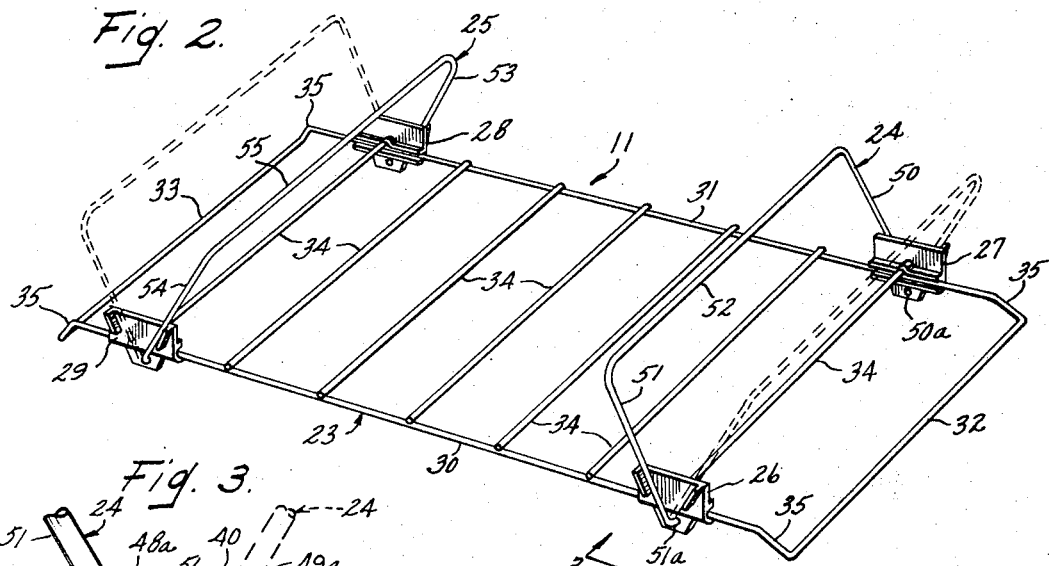
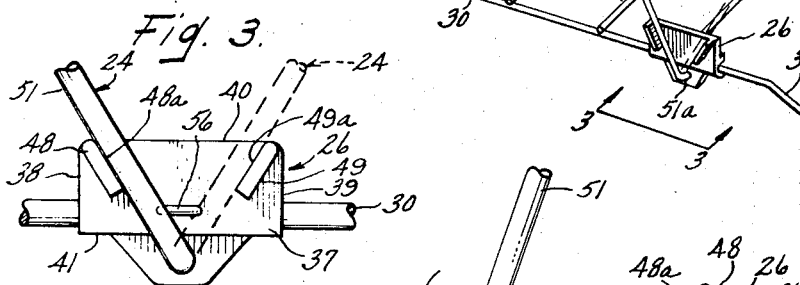
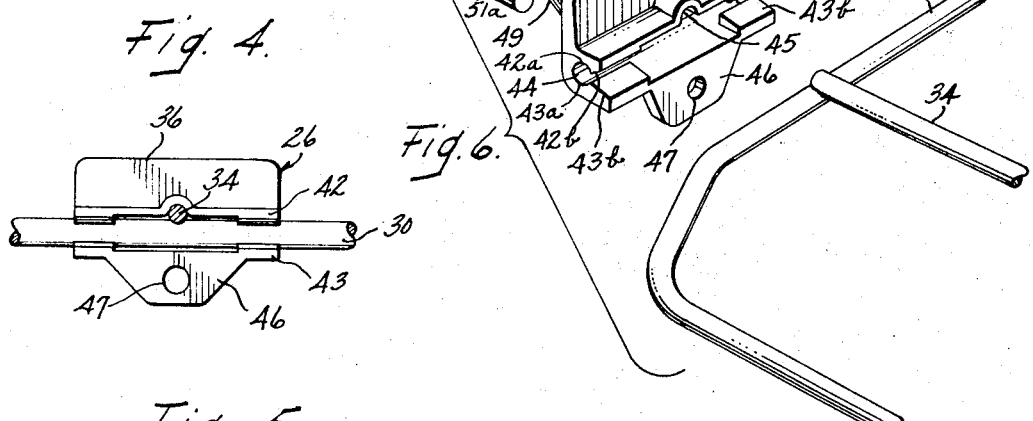
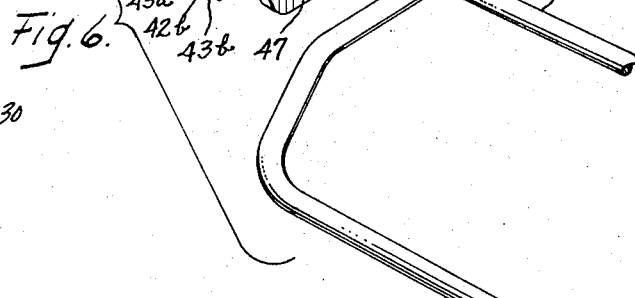
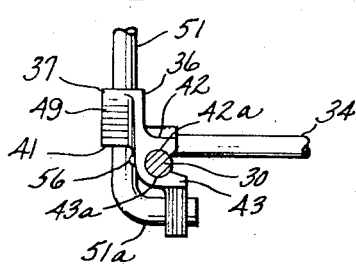
Inventor:
James A. Ottinger,
by Laurence R. Newton
Attorney United States Patent Office 3,365,071
Patented Jan. 23, 1968

3,365,071
RACK FOR SUPPORTING FOOD CONTAINERS AT SPACED LEVELS WITHIN A COOKING VESSEL
James A. Ottinger, Allentown, Pa., assignor to General Electric Company, a corporation of New York
Filed May 19, 1966, Ser. No. 551,266
11 Claims. (Cl. 211—126)

The present invention relates to food supporting racks; and, more particularly, to racks for supporting food containers at spaced levels within a cooking vessel.

It has been found desirable to support food containers within a cooking vessel, such as a food steamer, at two separate levels by use of a rack including a base member for supporting a container at a bottom level; and wherein supporting arms are pivotally connected to the base, the supporting arms having top portions capable of furnishing the sole support for food containers at an upper level.

An object of the present invention is to provide a rack of the character just indicated which includes improved means for pivotally connecting supporting arms to the base of the rack and provides abutment means for holding the supporting arms in desired positions.

A further object is the provision of a rack structure wherein clips are used to pivotally mount supporting arms to the base of the rack and wherein the arms may readily be assembled to or disassembled from the clips, and the clips may be readily assembled in proper position on or disassembled from the base for purposes of cleaning or storing the several elements.

A still further object is to provide a clip which may easily be mounted on the base of the support and which provides means wherein legs of supporting arms may be pivotally mounted on the clip and pivoted to desired positions as determined by abutment means on the clip.

In carrying out the objects of my invention in one form therefore, I have provided a rack which includes a base member capable of supporting a food container at a bottom level when the rack is positioned in a cooking vessel. A plurality of mounting clips are arranged in spaced pairs, and the clips of each pair are removably mounted directly across from each other on the side edges of the base. The clips each include an opening for pivotally mounting the end of a leg of a supporting arm therein; and the clips further include abutment means in the path of pivotal movement of the arm to stop the arm when it has been pivoted to a desired position capable of providing support for a food container at an upper level. Thus, when two generally U-shaped supporting arms have each been mounted on a respective pair of clips, the arms may be pivoted to a position where they are capable of providing the sole support for an upper food container above the bottom food container.

Other objects and advantages of my invention may best be understood by referring to the following description taken in connection with the accompanying drawing in which:

FIG. 2 is a perspective view of the rack of the present invention;

FIG. 3 is an enlarged view taken on the line 3—3 of FIG. 2;

FIG. 4 is a rear view of FIG. 3 with a leg of the supporting arm removed for clarity;

FIG. 5 is a side view of FIG. 3; and

FIG. 6 is an enlarged exploded view illustrating certain portions of the rack in perspective.

Figure 1:
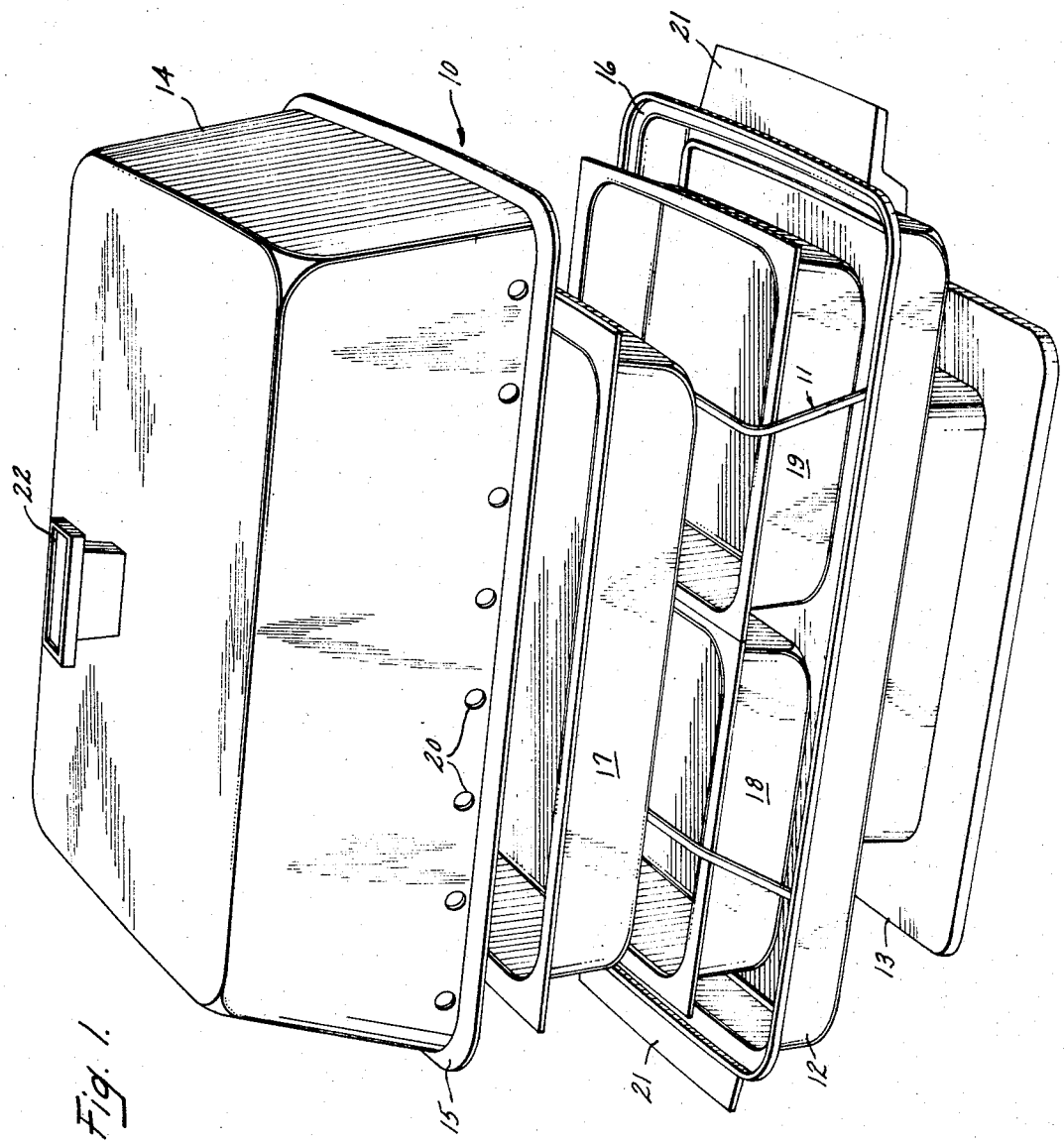
FIG. 1 is a perspective view of a cooking vessel with the rack of the present invention disposed therein.

Now referring to FIG. 1, there is illustrated a cooking vessel 10 with which a rack 11 of the present invention may advantageously be used, this drawing showing the rack in place in the vessel and performing its desired food container supporting function.

The cooking vessel 10, in the form of a food steamer, includes a main receptacle 12 having a supporting stand 13 connected to the bottom wall thereof. A hollow cover 14 includes a flange 15 along the edge of the side walls, and this flange is adapted to be positioned on a ledge 16 formed along the top edge of the side walls of the receptacle 12. When so positioned, the side walls and top wall of the cover 14 together with the side walls and bottom wall of the receptacle 12 define a food steaming compartment which accommodates food containers 17, 18 and 19. As seen clearly at FIG. 1, the rack 11 provides means for supporting the containers at separate levels within the steaming compartment. Apertures 20 in the cover provide for escape of some of the steam during a cooking operation to prevent a pressure build up in the compartment. Handles 21 and 22 mounted respectively on the receptacle and the cover provide means for transporting these elements.

It may be desirable to mount a heater and heater control means on the bottom of the receptacle 12 within the supporting stand 13. Since, however, heater and control means form no part of the present invention, I have not illustrated them specifically, it being understood that any suitable heater and control of known construction may be used. For that matter, it would be possible to eliminate the supporting base altogether, and to obtain heat for cooking by placing the bottom surface of the receptacle on the burner of a stove.

Now turning to FIGS. 2 through 6 there is illustrated in greater detail the rack 11 forming the subject of my invention. The rack includes, as basic elements, a base member 23, supporting arms 24 and 25, and mounting clips 26, 27, 28 and 29 used to pivotally connect the supporting arms to the base member.

The base member 23 comprises a generally rectangular frame construction having opposite side edges 30 and 31 and opposite end edges 32 and 33 formed preferably of metallic wire such as stainless steel wire which is circular in cross-section. In order to provide a surface capable of supporting a food container, a plurality of spaced wire cross elements 34 which are circular in cross section extend between the sides 30 and 31 and are secured to the top surface of the side wires such as by welding. Slight downward bends 35 are preferably formed near the ends of each of the side wires 30 and 31 in order to space the end wires 32 and 33 slightly downwardly from the plane defined by the cross elements 34 and thereby assurance is gained that the base member is positioned above the bottom surface of a cooking receptacle when the rack is positioned therein.

Reference is now made to details of a mounting clip 26, it being understood that all of the mounting clips are substantially identical to each other. The mounting clip 26 has opposite side surfaces 36 and 37, opposite end edges 38 and 39, a top edge 40 and a bottom edge 41. A pair of spaced flanges 42 and 43 are formed integral with the surface 36 and extend substantially perpendicular thereto. As seen clearly at FIGS. 5 and 6, opposed inner surfaces of the flanges 42 and 43 immediately adjacent the surface 36 are provided with facial contours 42a and 43a corresponding generally to the facial contour of the side wires 30 and 31 of the rack, thereby defining a groove 44 which is only slightly larger in cross section than the wires 30 and 31. The opposed inner surfaces 42b and 43b of the flanges outwardly of the groove 44 are provided with surfaces which taper toward the groove so as to form an entrance to the groove which is smaller than the diameter of side wire 30. The outer ends of the flanges 42 and 43 are spaced apart from each other a distance slightly greater than the diameter of the wire 30.

The inner surface of the flange 42 has a channel 45 formed therein approximately midway between the opposite end edges of the clip, and the channel opens into the groove 44 and has a facial contour corresponding generally to and only slightly larger than the external surface of the cross elements 34. The axis of the channel 45 extends generally perpendicularly to the axis of the groove 44.

A downwardly projecting tab 46 is formed integral with the bottom surface of the flange 43, and this tab has an opening 47 extending therethrough to pivotally mount a supporting arm therein as will be explained hereinafter in greater detail.

The side 37 of the clip opposite from the flanges has first and second abutments 48 and 49 extending therefrom. These abutments each have a generally planar surface 48a and 49a. The surface 48a extends generally perpendicularly to the side surface 37 and is angularly related with respect to the end edge 38 in such a manner that when a support arm 24 engages the abutment (FIGS. 2 and 3) substantially the entire length of the surface 48a of the abutment is engaged by the support arm. The second abutment 49 engages the support arm 24 in a similar manner in a second position of the arm.

I prefer to use polypropylene for a material from which the mounting clips may be molded in one piece. I have found that this material has sufficient resistance to steam and boiling water and, furthermore, has a desirable resiliency. This resiliency is desirable, especially in the flanges 42 and 43 to permit the flanges to be forced slightly apart from each other when the side wire 30 is being forced into the groove 44; and, when the wire is in the groove, the flanges will return to their original position to hold the clip securely on the side wire. While polypropylene is preferred, any suitable material having the aforementioned desirable properties may be used.

As seen at FIG. 2, the supporting arm 24 is generally U-shaped and includes opposed legs 50 and 51 each having a free end 50a and 51a bent inwardly substantially perpendicularly to the main part of the leg. A cross member 52 connects the legs at the other end. The supporting arm 25 is substantially identical to the supporting arm 24 and also includes opposed legs 53 and 54 having free ends and a cross member 55 connecting the other end of the legs. The supporting arms are preferably formed of stainless steel wire having a circular cross section only slightly less in diameter than the diameter of the opening 47 in the tab 46. The legs are sufficiently resilient or have spring properties to permit, for example, the ends 50a and 51a of the legs 50 and 51 to be urged away from each other to position the end portions immediately outside of and adjacent the openings 47 in a pair of clips after the clips have been mounted on the base 23, and then the resiliency of the legs will urge the ends into the openings, and the main portion of legs 50 and 51 will bear against the outer sides of a pair of clips 26 and 27.

To assemble the rack 11 from the aforementioned components, the clips are first mounted on the side edges of the base portion in spaced pairs. Thus, the clips 26 and 27 are directly across from each other to provide one pair, and the clips 28 and 29 are directly across from each other to provide another pair. In mounting each of the clips, it will be understood, and again with reference to the clip 26 as an example of how each of the clips are mounted, that the channel 45 (FIG. 6) is aligned with an appropriate cross element 34. Now, the cross element 34 is received in the channel 45 as the side wire 30 urges the flanges 42 and 43 apart from each other. Finally the wire 30 snaps into place in the groove 44, and the clip is thereby securely mounted on the wire. Each of the mounting clips are appropriately mounted in a similar fashion. Now, the supporting arms 24 and 25 are each pivotally connected in a respective pair of clips by inserting the free ends of the arms in the openings in the manner outlined above. The rack structure which has now been assembled in this manner has the supporting arms 24 and 25 free to pivot about the axis of the openings in which they are mounted. For example, the arm 24 is pivotable between the solid and dotted line positions of FIGS. 2 and 3, it being understood that the abutments on the clips provide positive stops at each of these positions.

At this point, it should be pointed out that I prefer to form a bead 56 integral with the outer side surface 37 of each clip and extending only slightly outwardly therefrom (FIG. 5). This bead is to assure a slight frictional engagement between the leg 51 and the clip so that once the leg has been pivoted to one of the stop positions, inadvertent movement from the position is obviated.

With the rack assembled as above, the rack 11 may be positioned in the receptacle 12 of the cooking vessel. Now the support arms 24 and 25 are pivoted to an outer or second position (dotted line position of FIG. 2). In this position the cross members 52 and 55 are substantially the same distance apart as the distance between the ends 32 and 33 of the rack, and thereby substantially unobstructed access is obtained to the top surface of the base member 23. Food containers 18 and 19 may then be easily positioned on the base member without having to tilt the containers. Now, the racks may be pivoted to a first position (FIG. 1, and solid line position of FIG. 2). In this position, the cross members 52 and 55 are spaced apart a distance less than the distance between the end wires 32 and 33 so that a top food container 17 may be supported solely by the support arms, and there is no interference of the container with the walls of the cooking vessel. A measured quantity of water may be poured into the receptacle 12; and, after the cover 14 has been positioned thereon, the water may be heated to provide steam for cooking food in the container.

The foregoing is a description of an illustrative embodiment of the invention, and it is my intention in the appended claims to cover all forms which fall within the scope of the invention.

I claim:
1. A rack for supporting food containers at spaced levels within a cooking vessel, said rack comprising:
 (a) a base member having opposite connected side and end edges, said base member providing a first level for supporting a food container;
 (b) a plurality of mounting clips arranged in spaced pairs, the clips of each pair being removably mounted directly across from each other on the opposite side edges of the base member, each of said clips including means defining a longitudinal groove for said side edges of said base member to be received in the groove, means defining an opening in said clip, and first abutment means on said clip;
 (c) first and second generally U-shaped support arms each including opposed legs having a free end and a cross member connecting the legs at the other end, the free ends of the legs of the first support arm being pivotally mounted in respective openings in one pair of clips, and the free ends of the legs of the second support arm being pivotally mounted in respective openings in another pair of clips;
 (d) said abutment means on said clips being located in the path of travel of said legs for said abutment means to stop pivotal movement of said supporting arms in a first position when said cross members are spaced apart from each other a distance less than the distance between the end edges of the base member so that said cross members together provide a second level for supporting a food container.

2. The rack as defined in claim 1 wherein each of said clips includes a second abutment located in the path of travel of said legs for stopping pivotal movement of said supporting arms in a second position when said cross members of said arms are spaced apart from each other a distance substantially equal to the distance between the end edges of the base member.

3. The rack as defined in claim 1 wherein said base member comprises a wire frame and a plurality of spaced wire cross elements extending between the opposite side edges of the frame.

4. The rack as set forth in claim 3 wherein a channel is formed in said groove defining means, said channel opening into said groove and having an axis extending generally perpendicular to the axis of the groove, and said channel having a facial contour corresponding generally to the facial contour of said cross elements for receiving a portion of a cross element when said side edge of said base member is received in said groove.

5. The rack as set forth in claim 3 wherein each of said clips have opposite side surfaces and said groove is defined by spaced flanges extending from one of said sides, portions of the opposed inner surfaces of said flanges having a facial contour corresponding generally to the facial contour of the sides of said wire frame, said portions providing an entrance to said groove which is smaller than the diameter of the frame wire, and said flanges having sufficient resiliency to permit said wire to be snapped into said groove.

6. The rack as set forth in claim 5 wherein said flanges have opposed inner surfaces at the outer end thereof which taper toward the entrance to the groove, said tapered surfaces cooperating with said wires to resiliently spread said flanges apart from each other just prior to receiving the wire in the groove.

7. The rack as set forth in claim 5 wherein the abutment means on each of said clips is on the opposite side surface of said clip from said groove.

8. The rack as set forth in claim 7 wherein said surface having said abutment means also has a bead extending outwardly therefrom a slight distance for providing a slight outward bias to said legs during pivotal movement thereof.

9. A clip for pivotally mounting one leg of a supporting arm of a rack on a base portion of the rack, said clip comprising:
  (a) a main body portion having opposite side surfaces and defining a longitudinal groove opening outwardly of one of said side surfaces for receiving a side edge portion of the base to mount the clip on the base;
  (b) means defining an opening in said body portion for receiving the end of the leg of a supporting arm to pivotally attach said leg to said clip; and
  (c) abutment means forming a part of said body portion for engaging the leg to stop movement thereof in a predetermined pivotal position of the arm.

10. The clip as set forth in claim 9 wherein said abutment means is located on the opposite side surface of said clip from said groove.

11. The clip as set forth in claim 9 wherein said groove is defined by spaced flanges, and the opposed surfaces at the outer ends of the flanges taper inwardly toward each other so that said flanges at the outer end of the tapered portion define an entrance which is wider than the side edge of the base, and the inner ends of the tapered portion define an entrance to the groove which is narrower than the side edge of the base for said tapered portions to resiliently bias said flanges away from each other until said edge is received in the groove.

References Cited

UNITED STATES PATENTS

| 2,212,164 | 8/1940 | McMullen | 99—426 |
| 2,316,620 | 4/1943 | Rees | 211—153 XR |
| 2,520,389 | 8/1950 | Ferris | 99—449 |
| 2,924,168 | 2/1960 | Jamentz | 99—426 |

ROY D. FRAZIER, *Primary Examiner.*

WILLIAM D. LOULAN, *Assistant Examiner.*